United States Patent
Rotter et al.

(10) Patent No.: US 10,313,040 B2
(45) Date of Patent: Jun. 4, 2019

(54) COMMUNICATION DEVICE, COMMUNICATION SYSTEM, AND METHOD FOR SYNCHRONIZED TRANSMISSION OF TELEGRAMS

(71) Applicant: Phoenix Contact GmbH & Co. KG, Blomberg (DE)

(72) Inventors: Christoph Rotter, Hessisch Oldendorf (DE); Volker Detert, Kirchlengern (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 110 days.

(21) Appl. No.: 15/107,024

(22) PCT Filed: Sep. 4, 2015

(86) PCT No.: PCT/EP2015/070208
§ 371 (c)(1),
(2) Date: Jun. 21, 2016

(87) PCT Pub. No.: WO2016/037932
PCT Pub. Date: Mar. 17, 2016

(65) Prior Publication Data
US 2018/0013506 A1    Jan. 11, 2018

(30) Foreign Application Priority Data
Sep. 8, 2014  (DE) .................. 10 2014 112 901

(51) Int. Cl.
*H04L 12/28*    (2006.01)
*H04J 3/06*    (2006.01)
*H04L 12/40*    (2006.01)

(52) U.S. Cl.
CPC .......... *H04J 3/0655* (2013.01); *H04J 3/0667* (2013.01); *H04J 3/0694* (2013.01); *H04L 2012/4026* (2013.01)

(58) Field of Classification Search
CPC ........................................... H04J 3/06
See application file for complete search history.

(56) References Cited

U.S. PATENT DOCUMENTS 7,394,836 B2    7/2008  Ko et al.
2004/0114602 A1*  6/2004  Ko ..................... H04L 47/50
                                                370/395.4

(Continued)

FOREIGN PATENT DOCUMENTS

CN    102244603 A    11/2011
CN    103081414 A    5/2013

(Continued)

OTHER PUBLICATIONS

"Chinese First Office Action and Search Report", Issued in Parallel Chinese Patent Application 2015800137558, dated Nov. 2, 2017, 15 pp.

(Continued)

*Primary Examiner* — Brandon M Renner
(74) *Attorney, Agent, or Firm* — Kaplan Breyer Schwarz, LLP

(57) ABSTRACT

To solve the problem of still being able to use an inexpensive network controller which can store only a single transmission time, even when telegrams from a plurality of application modules need to be sent in synchronized fashion and the transmission times thereof need to be reliably ascertained and reliably associated with the respective telegrams, provided is a communication device for the synchronized sending of telegrams, a communication system including such a communication device, and a method for the syn- (Continued)

chronized sending of telegrams. The communication device comprises a coordination device.

18 Claims, 1 Drawing Sheet

(56) References Cited

U.S. PATENT DOCUMENTS

| | | | | |
|---|---|---|---|---|
| 2011/0019698 A1* | 1/2011 | Akae | H04J 3/0664 | 370/509 |
| 2011/0122775 A1* | 5/2011 | Zampetti | H04J 3/0641 | 370/242 |
| 2012/0065907 A1* | 3/2012 | Kozakai | G01R 19/2513 | 702/57 |
| 2012/0236873 A1* | 9/2012 | Steindl | H04L 12/4035 | 370/432 |
| 2014/0341228 A1* | 11/2014 | Yamada | H04L 69/28 | 370/412 |
| 2015/0172220 A1* | 6/2015 | Rahamim | H04L 12/437 | 370/389 |
| 2016/0029052 A1* | 1/2016 | Pinks | H04N 21/23602 | 725/109 |
| 2016/0337707 A1* | 11/2016 | Oh | H04N 21/2381 | |

FOREIGN PATENT DOCUMENTS

| | | |
|---|---|---|
| CN | 103168446 A | 6/2013 |
| DE | 10148331 A1 | 9/2001 |
| EP | 2568631 A1 | 3/2013 |

OTHER PUBLICATIONS

Authorized Officer: Nora Lindner, "IPRP & Written Opinion (w/Translation)", Issued in International Patent Application PCT/EP2015/070208, Report Completed Mar. 14, 2017, 18 pp.

"Office Action", dated Apr. 30, 2015, issued in counterpart application DE102014112901.6.

Authorized Officer: Jacques Reichert, "International Search Report and Written Opinion", dated Nov. 13, 2015, issued in counterpart application PCT/EP2015/070208.

Authorized Officer: Martin Koppl, "International Search Report" translation issued in counterpart International Patent Application No. PCT/EP2015/070208, dated Nov. 13, 2015, Publisher: PCT, Published in: WO.

"Intel Ethernet Controller I210 Family", XP055225114, Jan. 1, 2012, Publisher: http://www.intel.com/content/dam/www/public/us/en/documents/product-briefs/i210-ethernet-controller-family-brief.pdf.

* cited by examiner

COMMUNICATION DEVICE, COMMUNICATION SYSTEM, AND METHOD FOR SYNCHRONIZED TRANSMISSION OF TELEGRAMS

FIELD OF THE INVENTION

The invention relates to a communication device for synchronized transmission of telegrams, to a communication system comprising such a communication device, and to a method for synchronized transmission of telegrams.

BACKGROUND OF THE INVENTION

In the environment of automated controlled processes and industrial networks there are high requirements concerning real-time capability of the communication between the individual network and communication subscribers (briefly referred to as subscribers below), regardless of whether the respective communication system is based on conventional fieldbus technologies or industrial Ethernet technologies. A key aspect to meet the real-time requirements is to ensure precisely timed cyclic communication. For example, first each subscriber gets assigned a time slot during which it is allowed to transfer a limited amount of data. Second, each communication cycle is divided into time periods for transmission of real-time data and time periods for transmission of non-real-time data, in order to prevent the two data categories from mutual influence. Another crucial aspect is precise time synchronization of the communication subscribers. For this purpose, special protocols such as the "Simple Network Transport Protocol" (SNTP, according to RFC4330) or the "Precision Time Protocol" (PTP, according to IEEE1588) may be employed, which are intended for time synchronization of clocks distributed in the network. Another protocol for time synchronization that can be mentioned is the "Precision Transparent Clock Protocol" (PTCP, according to IEC61158) which is for example employed in PROFINET-based communication systems.

According to PTCP, the clocks of the subscribers are organized in a master-slave hierarchy, and synchronization of the clocks is accomplished by exchanging different PTCP telegrams. For this purpose, four types of telegrams are defined according to PTCP, which require a highly accurate determination of the transmission times of the respective telegrams. These PTCP telegrams are generated by four different PTCP modules or state machines implemented in the application layer. Specifically, these include synchronization telegrams of the PTCP master protocol machine or the PTCP slave protocol machine and request telegrams of the line delay request protocol machine and response telegrams of the line delay response protocol machine. These telegrams are generated by the PTCP modules independently of each other and asynchronously to each other, and therefore they might be provided at the same time for being transmitted. In the case of the synchronization telegrams of the PTCP master protocol machine and of the PTCP slave protocol machine, the ascertained transmission times are directly written into and transmitted with the telegram. In the case of the request telegrams of the line delay request protocol machine and the response telegrams of the line delay response protocol machine, however, the ascertained transmission times are read out to be sent only with a subsequent telegram.

Hitherto, special hardware was necessary for transmitting such telegrams and for most precisely ascertaining and associating the transmission times. Network controllers for use in industrial networks that have a sufficiently precise time stamp unit implemented in hardware are available, for example, under the product names "ERTEC" of Siemens, "NETX" of Hilscher, or "TPS-1" of Renesas/Phoenix Contact. However, such special network controllers are very expensive, especially when compared to conventional network controllers known in the PC sector, which are intended for use in private networks or office networks.

However, for some time network controllers have been available, which are made from inexpensive standard components known in the PC sector and should allegedly still be suitable for use in industrial networks. For example, such a network controller with the product name "I210" has been available from Intel since the end of 2012.

SUMMARY OF THE INVENTION

Applicant's studies have shown that such low-cost network controllers may in principle be useful even for use in industrial Ethernet-based communication systems such as for example with PROFINET and may even satisfy the real-time requirements already mentioned above, e.g. in compliance with PROFINET RT (Real Time) and PROFINET IRT (Isochronous Real Time). In particular, a network controller such as the I210 is capable of determining transmission times with sufficient accuracy in order to implement the PTCP protocol.

However, a major problem in this case is that an inexpensive network controller known from the PC sector, such as the I210, is only capable of storing a single determined transmission time, which is the respective current transmission time. That means, a newly ascertained transmission time will overwrite the transmission time previously ascertained and stored. Because of this limitation, transmission times might be lost and reliable association of ascertained transmission times with transmitted telegrams originating from different application modules is not possible. Thus, in particular with respect to PTCP, it is not possible with such network controllers as the I210 to reliably associate the ascertained transmission times with the transmitted telegrams from different PTCP modules.

Therefore, an object on which the invention is based is to provide a way of still being able to use an inexpensive network controller such as the I210 which can only store a single transmission time, even if telegrams from a plurality of application modules need to be sent in synchronized manner and the transmission times thereof need to be reliably ascertained, so that in particular use thereof in industrial networks is possible.

According to the invention, this object is achieved by the communication device, communication system, and method in accordance with the illustrative embodiment of the present invention.

The communication device according to the invention for synchronized transmission of telegrams comprises at least two application devices, each one adapted to provide at least one telegram, wherein the at least two telegrams are to be sent in synchronized manner. Furthermore, the communication device comprises a transmission device and a coordination device. The coordination device is adapted to forward to the transmission device, in predetermined manner, the telegrams provided by the application device, and to prompt the transmission device to transmit the telegrams to be sent. The transmission device comprises a time stamp unit and a memory unit, and the time stamp unit is adapted to ascertain a current transmission time for each transmitted telegram which was provided by one of the at least two application devices, and the memory unit is adapted to store only the current transmission time ascertained by the time stamp unit. The coordination device is further adapted to read out the current transmission time from the memory unit and to associate it with the respective telegram. But above all, the coordination device is adapted to prompt the transmission device to transmit a further telegram to be sent only when the current transmission time has been read out from the memory unit by the coordination device.

The communication device of the invention and in particular the coordination device thereof provide many advantages. For example, the transmission device, the memory device and/or the time stamp unit may be components of a low-cost network controller such as the I210, while reliable association of transmission times with the transmitted telegrams from the different application devices is still ensured.

According to another advantageous aspect of the invention, the coordination device is suitably adapted to supply the respective transmission time and an identification of the telegram associated with the respective transmission time to the application device which provided the associated telegram.

According to a further advantageous aspect of the invention, the coordination device is adapted to operate cyclically in accordance with a communication protocol, and is in particular adapted to cyclically read out the memory unit at predetermined times.

According to another advantageous aspect of the invention, the application devices are adapted to provide telegrams temporally independently and/or independently of each other. In particular, according to another aspect of the invention at least one of the application devices is configured as a state machine and is adapted to provide at least one telegram to be sent in accordance with the precision transparent clock protocol (PTCP). Thus, it is possible to implement the PTCP protocol, since the different application devices may for example comprise the PTCP modules mentioned above, which generate PTCP telegrams.

According to another advantageous aspect of the invention, the coordination device is adapted to prioritize the telegrams provided by the application devices.

In particular, according to another aspect of the invention the coordination device is furthermore adapted to forward the telegrams to the transmission device according to the priority thereof, and/or to prompt the transmission device to transmit the telegrams according to the priority thereof.

According to another advantageous aspect of the invention, the coordination device is adapted to prompt the transmission device to transmit a further telegram even if the coordination device failed to read out the current transmission time from the memory unit, and in particular when reading out failed after a predetermined period or a predetermined number of cycles has elapsed. In this manner, blocking of the transmission device is prevented.

The communication system of the invention comprises a transmission medium and at least one communication device according to the invention connected to the transmission medium, which is configured as described above and in particular according to at least one of the additional advantageous aspects described.

According to a further advantageous aspect of the invention, the communication system is configured for cyclic communication in accordance with a communication protocol and in particular in accordance with PROFINET RT or PROFINET IRT. In this case, the coordination device of the communication device according to the invention is adapted to operate cyclically in accordance with the communication protocol of the communication system, and in particular to cyclically read out the memory unit at predetermined points in time.

The method of the invention for synchronized transmission of telegrams is in particular performed using a communication device according to the invention, which is configured as described above and in particular according to at least one of the additional advantageous aspects described, and suitably this communication device is connected to a transmission medium and forms part of a communication system according to the invention as described above. This method comprises the steps of:

a) providing, in a communication device, at least two telegrams which are to be sent in synchronized manner;
b) forwarding the telegrams to a transmission device of the communication device;
c) transmitting a first one of the telegrams, by the transmission device;
d) generating, in the transmission device, a transmission time for the first telegram;
e) storing the transmission time in the transmission device which can only store a single transmission time;
f) reading out the stored transmission time; and
g) associating the read-out transmission time with the first telegram and storing the association in the communication device;
h) once the transmission time has been read out, repeating steps c) through g); wherein
step c) comprises transmitting a further telegram;
step d) comprises generating a transmission time for the further telegram;
step e) comprises storing the transmission time in the transmission device;
step f) comprises reading out the stored transmission time; and
step g) comprises associating the read-out transmission time with the further telegram and storing the association in the communication device.

The inventive method also provides many advantages. For example, in particular due to method steps f), g) and h) it is possible to use an inexpensive network controller such as the I210 as the transmission device, while still ensuring reliable association of the transmission times with the transmitted telegrams from the different application devices.

However, this sequence of method steps is only a preferred but not necessarily a chronological order. Other sequences of steps and the inclusion of further steps are possible as well.

According to another advantageous aspect of the invention, the telegrams are provided asynchronously in step a). In particular, according to a further advantageous aspect the telegrams are provided by a first and/or second application device in step a), and in step g) the respective transmission time and an identification of the telegram associated with the respective transmission time are supplied to the application device that provided the associated telegram.

According to another advantageous aspect of the invention it is contemplated that in step b) the telegrams are first forwarded to a coordination device of the communication device and thence to the transmission device, and/or that steps f) and g) are controlled by a coordination device.

According to a further advantageous aspect of the invention, step h) is performed for each further telegram that is to be sent in synchronized manner. In particular, according to a further advantageous aspect at least steps c) to g) are performed cyclically in accordance with a communication protocol.

According to another advantageous aspect of the invention, step b) comprises prioritizing of the telegrams, and furthermore the forwarding of the telegrams in step b) and/or the transmitting of the telegrams in step c) is controlled according to the priority thereof.

BRIEF DESCRIPTION OF THE DRAWINGS

These and further features and advantages of the invention will become apparent from the following description of exemplary embodiments in conjunction with the accompanying drawings, wherein.

DETAILED DESCRIPTION

Figure 1:
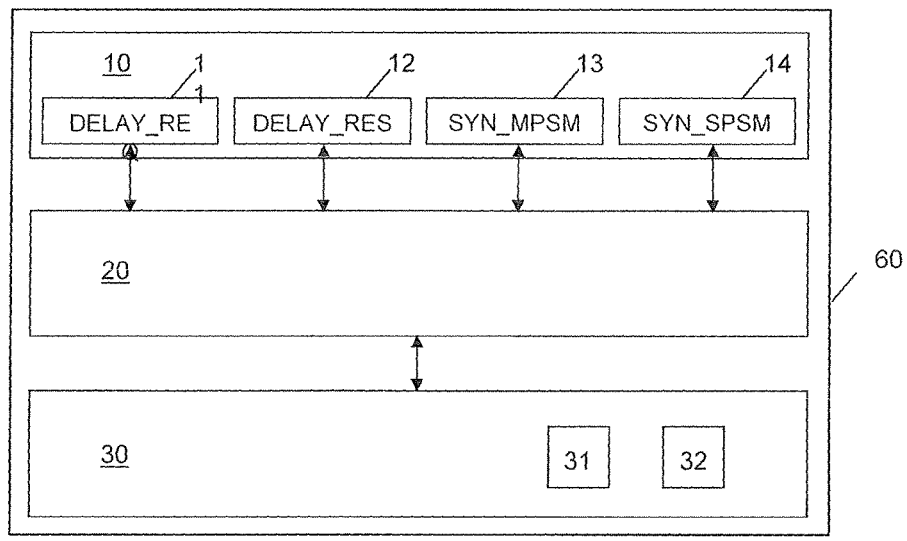
FIG. 1 is a schematic diagram of a communication device according to an embodiment of the invention.

FIG. 1 schematically illustrates a communication device 60 according to a preferred embodiment of the invention. Communication device 60 may be configured as a bus subscriber which is capable of transmitting telegrams to other communication devices and of receiving telegrams from other communication devices. In an application layer 10, communication device 60 includes four application devices 11, 12, 13, 14, each one configured to generate and provide telegrams that are to be sent in synchronized manner, and the providing of the telegrams occurs both independently from each other and temporally independently, which means essentially asynchronously. Furthermore, communication device 60 comprises a transmission device 30 and a coordination device 20. Coordination device 20 are adapted to forward in predetermined manner the telegrams provided by application devices 11, 12, 13, 14 to the transmission device 30, and to prompt the transmission device 30 to transmit the telegrams that are to be sent. Coordination device 20 may be implemented as a software-based driving layer. For this purpose, an appropriate program code may be stored in a memory means of communication device 60, which is executable or can be run by a controlling device of communication device 60, which controlling device comprises a controller or processor, for example. However, the memory and controlling devices of communication device 60 are not illustrated in FIG. 1. It is as well possible, however, that the coordination device 20 itself includes a memory and/or controlling device.

Transmission device 30 includes a time stamp unit 31 and a memory unit 32, and the time stamp unit 31 is adapted to ascertain a transmission time for each telegram to be sent that is provided by one of the application devices 11, 12, 13, 14 and forwarded by the coordination device 20 to the transmission device 30. The memory unit 32 of transmission device 30 is adapted to store a single transmission time and more particularly only the current transmission time most recently determined by time stamp unit 31. Transmission device 30, time stamp unit 31, and memory unit 32 may be components of a network card or a network controller. Such a network controller is available from Intel, for example, under the product name I210.

Coordination unit 20 is furthermore adapted to read out the current transmission time from memory unit 32 and to associate it with the respective telegram for which that transmission time has been ascertained by time stamp unit 31. But above all, coordination device 20 is adapted to not prompt and control the transmission device 30 to transmit a further telegram to be sent before the current transmission time has been read out from memory unit 32 by coordination device 20. This reliably prevents any transmission time that has not yet been read out from memory unit 32 from being lost by being overwritten with another transmission time stamp.

Furthermore, coordination device 20 herein is adapted to supply the respective transmission time and an identification of the telegram associated with the respective transmission time to the respective application devices 11, 12, 13, 14 that provided the associated telegram. The identification may be a number, in particular a sequence number, or an address, or a checksum of the telegram, for example.

Coordination device 20 may in particular moreover function as a driver for transmission device 30, or it may cooperate with a driver for transmission device 30 not detailed in the figures.

In addition, coordination device 20 is adapted to prioritize the telegrams provided by application devices 11, 12, 13, 14, and then to forward them to transmission device 30 according to their priority, and to prompt the transmission device 30 to transmit the telegrams according to their priority. That means, due to the prioritization by coordination device 20 the telegrams are possibly sent in a different order than they were provided by the application devices. For this purpose, the coordination device 20 has associated therewith a buffer unit, though not illustrated in the figures, in which the telegrams to be sent are first buffered and can then be evaluated and prioritized. In this case, the buffer unit may be included in coordination device 20 or in transmission device 30, for example, but may as well be arranged otherwise.

Figure 2:
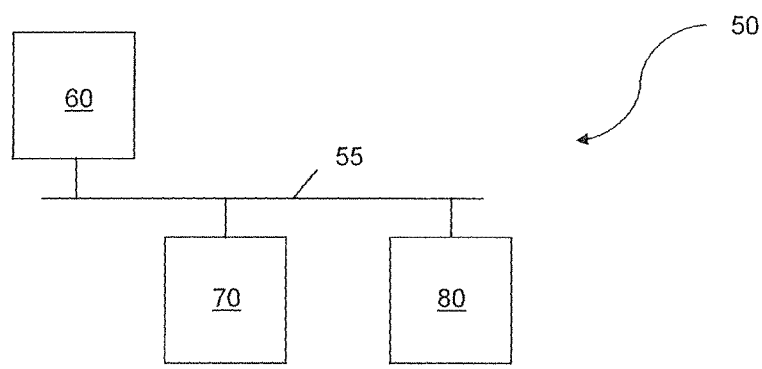
FIG. 2 is a schematic diagram of a communication system according to an embodiment of the invention.

FIG. 2 schematically illustrates a communication system 50 according to a preferred embodiment of the invention. Here, communication system 50 comprises a transmission medium 55 and three communication devices 60, 70, and 80 connected thereto, of which communication device 60 is configured as described above with reference to FIG. 1. The two other communication devices 70 and 80 will be discussed in more detail below.

Communication system 50 is configured for cyclic communication in accordance with a communication protocol, which is PROFINET IRT in the present case. In this case, the coordination device 20 of communication device 60 is adapted for cyclic operation according to this communication protocol, and in particular for cyclically reading out memory unit 32 at predetermined points in time, and also for cyclically prompting the transmission device 30 to transmit a telegram, if a telegram to be sent is provided. One cycle has a duration of one millisecond, for example.

Appropriately, coordination device 20 in this case is further adapted to prompt the transmission device 30 to transmit a further telegram to be sent even if the current transmission time could not be read out from memory unit 32. However, coordination device 20 is preferably adapted to prompt the transmission device 30 to transmit a further telegram that is to be sent only after a predetermined time period or a predetermined number of communication cycles have elapsed, and to repeatedly attempt to read out the current transmission time from memory unit 32 during this time period or number of cycles. What concerns the reading of memory unit 32 by coordination device 20, this is essentially a timeout mechanism. Furthermore, application devices 11, 12, 13, and 14 are favorably adapted to wait for a predetermined time period to receive, from coordination device 20, the transmission time stamp for a telegram to be sent, and after this time to optionally provide the telegram again.

Application devices 11, 12, 13, and 14 are, for example, configured as PTCP modules or PTCP state machines for providing PTCP telegrams. As can be seen from FIG. 1, application device 11 is configured as a line delay request protocol machine (DELAY_REQ) for providing request telegrams, application device 12 is configured as a line delay response protocol machine (DELAY_RES) for providing response telegrams, application device 13 is configured as a PTCP master protocol machine (SYN_MPSM) for providing master synchronization telegrams, and application device 14 is configured as a PTCP slave protocol machine (SYN_SPSM) for providing slave synchronization telegrams.

Thus, using communication device 60 and communication system 50 according to FIGS. 1 and 2, the PTCP protocol can be executed even if the transmission device 30 is a low-cost network controller such as the aforementioned I210. Obviously, communication device 60 may comprise a receiving device in addition to the transmission device 30, though not shown in the figures. In other exemplary embodiments, communication device 60 may comprise a combined transceiver device which may constitute a component of a network card. Therefore, communication device 60 is also adapted to receive and further process telegrams transmitted in synchronized manner, and especially PTCP telegrams.

The two other communication devices 70 and 80 illustrated in FIG. 2 may also be configured as communication devices according to the invention and in particular like communication device 60. In another exemplary embodiment not shown, they could as well be configured in conventional manner to support the highly accurate determination and reliable association of transmission times with transmitted telegrams and especially PTCP telegrams, by comprising specific network controllers such as the "ERTEC" of SIEMENS, for example.

With continuing reference to FIGS. 1 and 2, the present invention will be explained in more detail below by way of the example of PTCP and PROFINET IRT.

The four PTCP state machines 11, 12, 13, and 14 are arranged in the application layer 10 of communication device 60. Each of the PTCP state machines generates PTCP telegrams to be sent of a particular type, and the PTCP state machines are per se not synchronized with transmission device 30. Possibly, the respective PTCP state machine will subsequently wait for a response telegram, as is the case with line delay request protocol machine 11, for example, which after having generated a line delay request telegram will wait for a line delay response telegram from a line delay response protocol machine of one of the other communication devices 70 and 80. At the same time, only one of PTCP state machines 13 and 14 will be active, PTCP master protocol machine 13 or PTCP slave protocol machine 14, because according to the PTCP protocol a communication device either functions as a PTCP master or as a PTCP slave, so that only one of these two PTCP state machine generates relevant synchronization telegrams. Thus, PTCP telegrams are generated by three PTCP state machines independently and asynchronously, so that three telegrams to be sent might be provided simultaneously.

It should be mentioned here that PTCP is a port-to-port protocol, that means a PTCP telegram is transmitted from a specific PTCP module of a first subscriber to a corresponding PTCP module of a second subscriber. The communication system 50 may furthermore be adapted so that the second subscriber, e.g. communication device 70, is generally only capable of receiving telegrams from the first subscriber, e.g. communication device 60, and/or so that the second subscriber is generally only capable of transmitting telegrams to the first subscriber. Therefore, the diagram of a communication system 50 as shown in FIG. 2 is purely schematic, and the physical and/or logical network structure and topology may vary.

PTCP state machines 11, 12, 13, or 14 forward their telegrams to be sent to the coordination device 20. However, transmission of the PTCP telegrams does not occur exactly at the time at which each PTCP state machine forwards its telegram to coordination device 20. Rather, transmission can only take place during predetermined time slots of the protocol-specific communication cycle, so that the PTCP telegrams first need to be buffered temporarily.

It is known that in PROFINET IRT the communication or transfer cycle is divided into different periods which are reserved for specific types of communication. These are in particular a so-called red period for isochronous communications, and a green period for other communications, during which all other telegrams are transmitted. Furthermore, there is a yellow period which defines the transition from the green to the red periods and during which only telegrams are allowed to be transmitted which can reliably be transferred by the start of the red period.

For example, in the case of PROFINET IRT, a specific time slot is reserved for PTCP telegrams in the green period of each cycle, and PTCP telegrams can be transmitted only then, and only one PTCP telegram can be transmitted per cycle.

Coordination device 20 may operate cyclically in accordance with the PROFINET IRT protocol. During each red period it checks, on the one hand, whether at least one PTCP telegram is ready and should be sent in the subsequent green period, and on the other, whether a transmission time can be read out from memory unit 32 of transmission device 30, which was ascertained by time stamp unit 31 for a PTCP telegram transmitted during the green period of the previous cycle.

That means, the PTCP telegrams are first buffered and scheduled or planned by coordination device 20 for transmission during the next green period or one of the next green periods of the communication cycle. Moreover, coordination device 20 may prioritize the PTCP telegrams to be sent in terms of transmission order. For example, the line delay request telegram of state machine 11 will have a higher priority than the line delay response telegram of state machine 12.

Below, three exemplary scenarios of the sending of PTCP telegrams and of determining transmission times will be described. For the sake of simplicity and better understanding, the yellow period of the PROFINET IRT communication cycle will not be considered.

A first scenario relates to the transmission of a line delay request telegram and of a line delay response telegram by communication device 60, which PTCP telegrams are independent of each other here, since the line delay response telegram is related to a line delay request telegram from another communication device, such as communication device 70. Now, first, a line delay request telegram is generated by PTCP state machine 11 and forwarded to the coordination device 20. Independently thereof, a little later, a line delay response telegram is generated by PTCP state machine 12 and is forwarded to coordination device 20.

During the red period of a first communication cycle, coordination device 20 finds the line delay request telegram first provided, and forwards this telegram to transmission device 30 during the green period of the first communication cycle and prompts or controls the transmission device to transmit the line delay request telegram. Also during this green period, the time stamp unit 31 of the transmission device ascertains the time of transmission and writes it into memory unit 32. During the red period of the second communication cycle, the coordination device 20 finds the line delay response telegram provided by PTCP state machine 12 for being transmitted. During this red period, the coordination device 20 moreover finds, in memory unit 32, the transmission time of the line delay request telegram transmitted during the green period of the first communication cycle, retrieves and associates it with the telegram and presents the result to PTCP state machine 11 which may then read the result. During the green period of the second communication cycle, the coordination device 20 forwards the line delay response telegram to transmission device 30 and prompts the transmission device to transmit the telegram and to ascertain and store the transmission time using time stamp unit 31. During the red period of the third communication cycle, coordination device 20 then reads the transmission time from memory unit 32, associates it with the line delay response telegram and presents the result to PTCP state machine 12 which can then read the result.

A second scenario relates to the transmission of a line delay request telegram and a line delay response telegram with prioritization of the telegrams. Like in the first scenario, these PTCP telegrams are again independent of each other here. However, in contrast to the first scenario they are substantially simultaneously generated by PTCP state machine 11 and PTCP state machine 12, respectively, and forwarded to coordination device 20. In accordance with predefined settings, the coordination device 20 prioritizes the line delay request telegram from among the waiting PTCP telegrams to be sent and processes this telegram during a first communication cycle, and the line delay response telegram is buffered until being processed during a second communication cycle.

A third scenario relates to the transmission of a PTCP master synchronization telegram, a line delay request telegram and a line delay response telegram with prioritization of the telegrams. Again, these PTCP telegrams are independent of each other here. Like in the second scenario, the line delay request telegram and the line delay response telegram are substantially simultaneously generated by PTCP state machine 11 and PTCP state machine 12, respectively, and forwarded to coordination device 20. However, a little later a PTCP master synchronization telegram is generated by PTCP state machine 13 and forwarded to coordination device 20 for being transmitted.

Like in the second scenario, the coordination device 20, in accordance with predefined settings, prioritizes the line delay request telegram from among the two waiting PTCP telegrams to be sent and processes this telegram during a first communication cycle, and the line delay response telegram is buffered. During the red period of the second communication cycle, coordination device 20 not only finds the line delay response telegram but also the PTCP master synchronization telegram now ready to be transmitted. Since according to another predefined setting the PTCP master synchronization telegram has highest priority, the PTCP master synchronization telegram from among the two PTCP telegrams ready to be transmitted will be processed in the second communication cycle, while the line delay response telegram continues to be buffered until being processed during a third communication cycle.

Since, other than with a line delay request telegram and line delay response telegram, in case of a PTCP master synchronization telegram and also in case of a PTCP slave synchronization telegram the transmission time has to be ascertained but need not be read out, but rather is directly written into and transmitted with the telegram, the reading of memory unit 32 by the coordination device 20 can be omitted during the red period of the third communication cycle. Accordingly, the coordination device 20 is adapted to not expect a transmission time in memory unit 32 after having prompted the transmission of a PTCP master synchronization telegram or a PTCP slave synchronization telegram.

Another particular difference of the PTCP master synchronization telegrams and PTCP slave synchronization telegrams compared to the line delay request telegrams and line delay response telegrams is that they need only be generated once by the relevant state machine 13 and 14, respectively, and forwarded to coordination device 20. Coordination device 20 then is favorably adapted to store this telegram as a kind of template and to automatically cyclically forward a corresponding PTCP master synchronization telegram or PTCP slave synchronization telegram to the transmission device 30, with a predefineable cycle of, e.g., 30 milliseconds, in particular in accordance with the PROFINET specification, and to prompt or drive the transmission device to transmit the respective synchronization telegram, and preferably the coordination device repeats this process until being actively stopped by PTCP state machine 13 or 14.

Finally, again more generally expressed, the inventive method for synchronized transmission of telegrams thus comprises the steps of:

a) providing, in a communication device 60, at least two telegrams which need to be sent in synchronized manner;

b) forwarding the telegrams to a transmission device 30 of communication device 60;

c) transmitting a first one of the telegrams by transmission device 30 to destination communication device 70 or 80 via transmission medium 55;

d) generating, in transmission device 30, a transmission time for the first telegram;

e) storing the transmission time in transmission device 30 which can only store a single transmission time, wherein transmission device 30 may be part of the network controller;

f) reading out the stored transmission time; and g) associating the read-out transmission time with the first telegram and storing the association in communication device 60;

h) once the transmission time has been read out, repeating steps c) through g); wherein step c) comprises transmitting the further telegram;

step d) comprises generating a transmission time for the further telegram;

step e) comprises storing the transmission time in transmission device 30;

step f) comprises reading out the stored transmission time; and step g) comprises associating the read-out transmission time with the further telegram and storing the association in communication device 60.

Depending on the application, it is possible that in step a) the telegrams are provided substantially asynchronously and in particular by a first and/or second application device 11, 12, 13, 14, and that in step g) the respective transmission time and an identification of the telegram associated with the respective transmission time is supplied to the application device which provided the associated telegram.

Furthermore, it may preferably be contemplated that in step b) the telegrams are first forwarded to coordination device 20 of communication device 60 and from there to transmission device 30, and/or that steps f) and g) are controlled by a coordination device 20.

It will be understood that step h) can and preferably will be performed for each further telegram that is to be sent in synchronized manner. In particular, steps c) to g) are performed cyclically according to a communication protocol.

Finally, it may be contemplated that in step b) the telegrams are prioritized, and that the forwarding of the telegrams in step b) and/or the transmitting of the telegrams in step c) is controlled according to their priority.

LIST OF REFERENCE NUMERALS

10 Application environment
11 Application device
12 Application device
13 Application device
14 Application device
20 Coordination device
30 Transmission device
31 Timestamp unit
32 Memory unit
50 Communication system
55 Transmission medium
60 Communication device
70 Communication device
80 Communication device

What is claimed is:

1. A communication device for synchronized transmission of telegrams, comprising:
    at least two application devices, each one adapted to provide at least one telegram, wherein said at least two telegrams are to be sent in synchronized manner;
    a transmission device; and
    a coordination device adapted to forward, in predetermined manner, the telegrams provided by the application devices to the transmission device, and to prompt the transmission device to transmit the telegrams to be sent;
    wherein the transmission device comprises a time stamp unit and a memory unit;
    wherein the time stamp unit is adapted to ascertain a current transmission time for each transmitted telegram which was provided by one of the at least two application devices;
    wherein the memory unit is adapted to store only the current transmission time ascertained by the time stamp unit;
    wherein the coordination device is adapted to prompt the transmission device to transmit a telegram to be sent and to ascertain and store the transmission time using the time stamp unit; and
    wherein the coordination device is further adapted to read out the current transmission time from the memory unit and to associate it with the corresponding telegram, and to prompt the transmission device to transmit a further telegram to be sent only when the current transmission time has been read out from the memory unit by the coordination device.

2. The communication device as claimed in claim 1, wherein the coordination device is adapted to supply the respective transmission time and an identification of the telegram associated with the respective transmission time to the application device which provided the associated telegram.

3. The communication device as claimed in claim 1, wherein the coordination device is adapted to operate cyclically in accordance with a communication protocol, and is further adapted to cyclically read out the memory unit at predetermined times.

4. The communication device as claimed in claim 1, wherein at least one of the application devices is a state machine and is adapted to provide at least one telegram to be sent in accordance with precision transparent clock protocol.

5. The communication device as claimed in claim 1, wherein the application devices are adapted to provide telegrams temporally independently of each other.

6. The communication device as claimed in claim 1, wherein the coordination device is adapted to prioritize the telegrams provided by the application devices.

7. The communication device as claimed in claim 6, wherein the coordination device is adapted to forward the telegrams to the transmission device according to the priority thereof, and/or to prompt the transmission device to transmit the telegrams according to the priority thereof.

8. A communication device for synchronized transmission of telegrams, comprising:
    at least two application devices, each one adapted to provide at least one telegram, wherein said at least two telegrams are to be sent in synchronized manner;
    a transmission device; and
    a coordination device adapted to forward, in predetermined manner, the telegrams provided by the application devices to the transmission device, and to prompt the transmission device to transmit the telegrams to be sent;
    wherein the transmission device comprises a time stamp unit and a memory unit;
    wherein the time stamp unit is adapted to ascertain a current transmission time for each transmitted telegram which was provided by one of the at least two application devices;
    wherein the memory unit is adapted to store only the current transmission time ascertained by the time stamp unit;
    wherein the coordination device is adapted to prompt the transmission device to transmit a telegram to be sent and to ascertain and store the transmission time using the time stamp unit; and
    wherein the coordination device is further adapted to read out the current transmission time from the memory unit and to associate it with the corresponding telegram, and to prompt the transmission device to transmit a further telegram to be sent only when either the current transmission time has been read out from the memory unit by the coordination device or if the coordination device failed to read out the current transmission time from the memory unit.

9. A communication system, comprising a transmission medium and at least one communication device according to claim 1 connected to said transmission medium.

10. The communication system as claimed in claim 9, configured for cyclic communication in accordance with a communication protocol.

11. A method for synchronized transmission of telegrams, using a communication device as claimed in claim 1, comprising the steps of:

a) providing, in a communication device, at least two telegrams which are to be sent in synchronized manner;
b) forwarding the telegrams to a transmission device of the communication device;
c) transmitting a first one of the telegrams, by the transmission device;
d) generating, in the transmission device, a transmission time for the first telegram;
e) storing the transmission time in the transmission device which can only store a single transmission time;
wherein the transmission device is prompted by the coordination device to perform steps c), d) and e);
f) reading out the stored transmission time; and
g) associating the read-out transmission time with the first telegram and storing the association in the communication device;
h) once the transmission time has been read out, the read-out transmission time has been associated with the first telegram, and the association has been stored in the communication device, repeating steps c) to g); wherein
step c) comprises transmitting a further telegram;
step d) comprises generating a transmission time for the further telegram;
step e) comprises storing the transmission time in the transmission device;
wherein the transmission device is prompted by the coordination device to perform steps c), d) and e);
step f) comprises reading out the stored transmission time; and
step g) comprises associating the read-out transmission time with the further telegram and storing the association in the communication device.

12. The method as claimed in claim 11, wherein step a) comprises providing the telegrams asynchronously.

13. The method as claimed in claim 11, wherein step b) comprises first forwarding the telegrams to a coordination device of the communication device and thence to the transmission device.

14. The method as claimed in claim 11, wherein steps f) and g) are controlled by a coordination device.

15. The method as claimed in claim 11, wherein step h) is performed for each further telegram that is to be sent in synchronized manner.

16. The method as claimed in claim 11, wherein in step a) the telegrams are provided by a first and/or second application device; and
wherein step g) comprises providing the respective transmission time and an identification of the telegram associated with the respective transmission time to the application device which provided the associated telegram.

17. The method as claimed in claim 11, wherein at least steps c) to g) are performed cyclically in accordance with a communication protocol.

18. The method as claimed in claim 11, wherein step b) comprises prioritizing the telegrams; and
wherein the forwarding of the telegrams in step b) and/or the transmitting of the telegrams in step c) is controlled according to the priority thereof.

* * * * *